N. ANDERSON.
TOP AND FENDER FOR TRACTORS.
APPLICATION FILED JAN. 22, 1920.
1,384,735.
Patented July 19, 1921.
2 SHEETS—SHEET 1.
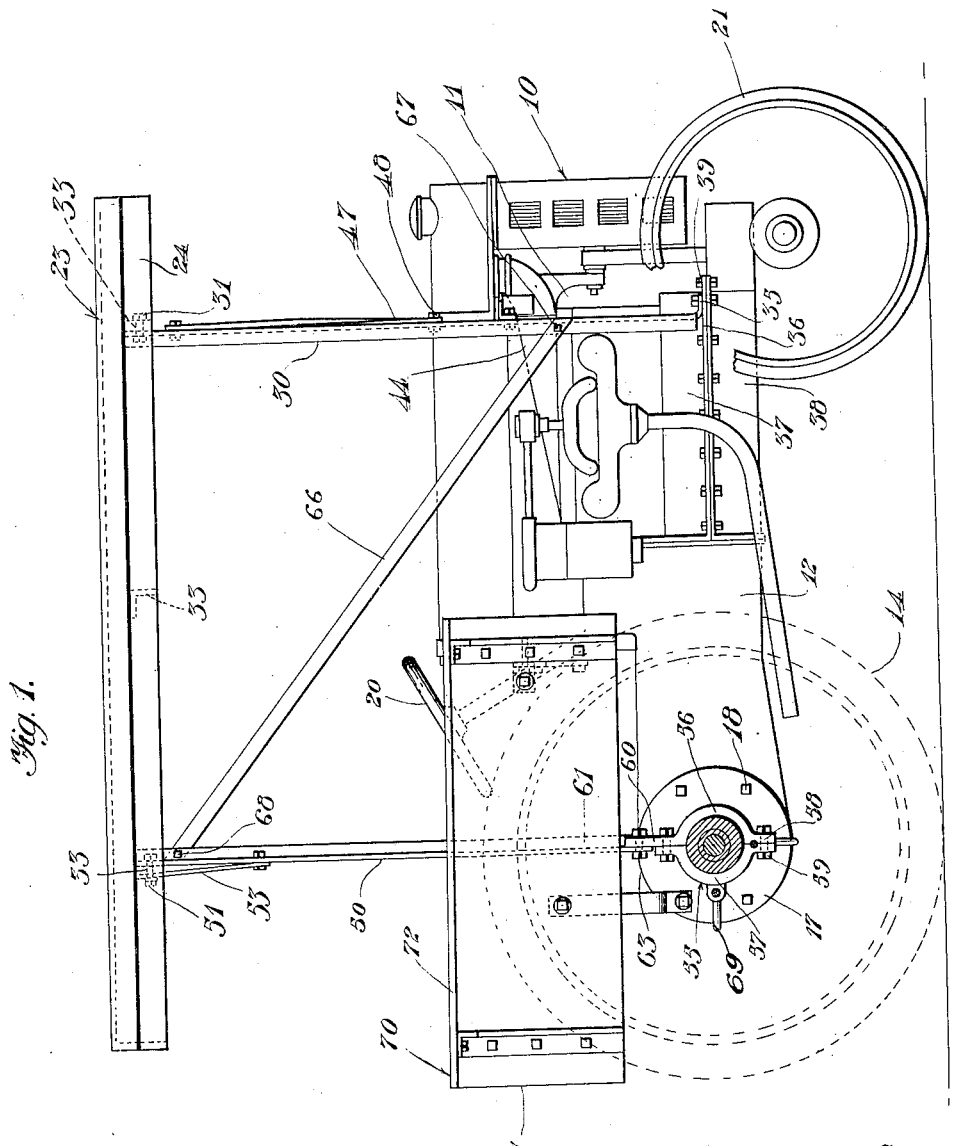

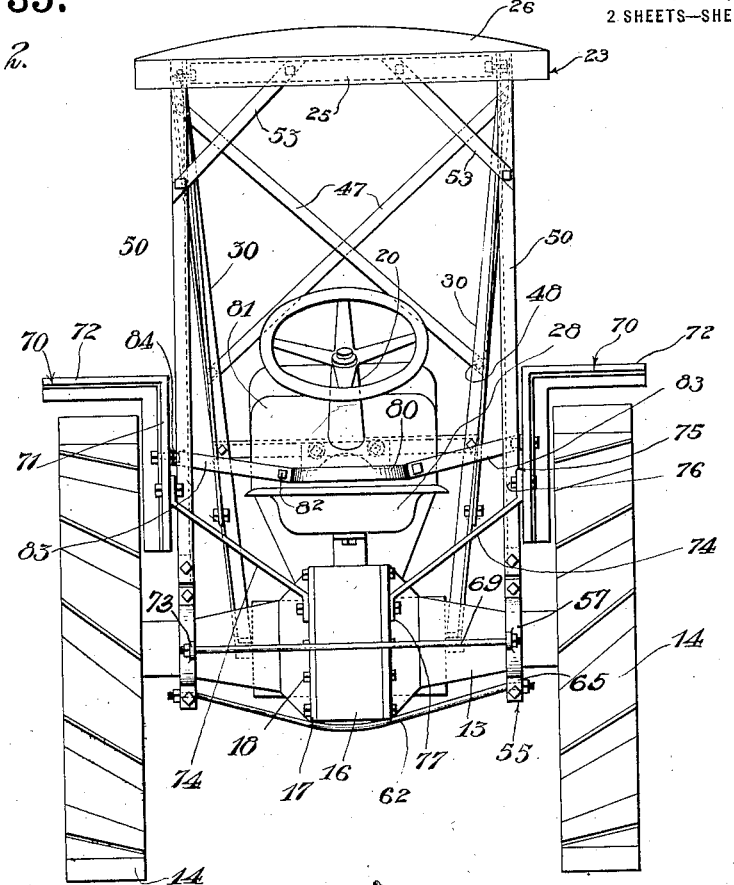

UNITED STATES PATENT OFFICE.

NILS ANDERSON, OF YUTAN, NEBRASKA.

TOP AND FENDER FOR TRACTORS.

1,384,735.   Specification of Letters Patent.   Patented July 19, 1921.

Application filed January 22, 1920. Serial No. 353,150.

*To all whom it may concern:*

Be it known that I, NILS ANDERSON, a subject of the King of Sweden, residing at Yutan, in the county of Saunders and State of Nebraska, have invented certain new and useful Improvements in Tops and Fenders for Tractors, of which the following is a specification.

This invention relates to improvements in tractors and more particularly to a fender and top therefor.

An important object of this invention is to provide novel means for attaching a covering or top to a Fordson tractor without in any way interfering with the operation of the tractor or necessitating any changes in the structure of the same.

A further object of the invention is to provide novel means for attaching the top or cover to the front portions of the tractor whereby rattling of cover or top as the result of vibration of the tractor will be prevented.

A further object of the invention is to provide a pair of fenders for a Fordson tractor having a novel form of bracing and attaching means which will reduce vibration of the fenders to a minimum.

Further objects and advantages of the invention will be apparent during the course of the following description.

In the accompanying drawings forming a part of this application and in which like numerals are employed to designate like parts through the same, Figure 1 is a side elevation of a Fordson tractor having the improved top and fenders applied thereto, Fig. 2 is a rear elevation of the tractor having the improved top and fenders applied, Fig. 3 is a fragmentary perspective of one of the attaching members for the top, Fig. 4 is a perspective of a clamp adapted to be secured to the rear axle housing of the tractor.

In the drawings wherein for the purpose of illustration is shown a preferred embodiment of the invention, the numeral 10 designates a tractor commercially known as the Fordson and which is provided with a prime mover 11, a transmission housing 12 and a rear axle housing 13.

With reference to Fig. 2, it will be noted that a pair of traction wheels 14 are arranged at the outer ends of the axle housing 13 and are, of course, operated by the rotation of the axle within said housing 13. The rear axle housing 13 is in two sections connected by an outer differential housing 16 to which is attached the flanged inner portions 17 of the sections of the axle housing by cap screws 18. The tractor is provided with the usual steering column 20 by which the front wheels 21 may be guided for controlling the direction of travel of the tractor.

One feature of this invention comprises the means for supporting the top 23 which is arranged above the tractor and is extended longitudinally of the same for affording the desired protection to the tractor from the inclemencies of the weather. The top which is generally designated by the numeral 23 consists of longitudinal sides 24 connected by end pieces 25 and transversely extending bowed cross members 26. A suitable waterproof covering may of course be secured to the top 23 so as to prevent the leakage of water through the top and on to the tractor.

With reference to Fig. 1, it will be noted that the top 23 extends substantially for the entire distance of the tractor and therefore in addition to protecting the working parts of the same from the weather will afford a substantial degree of protection to the operator who seats himself upon the usual seat 28.

The front portion of the top 23 is supported by a pair of outwardly diverging angle bars 30 which have their upper ends secured to the top by bolts 31. As illustrated in Fig. 1, the bolts 31 are extended through one of a plurality of spaced parallel cross beams 33 which in addition to serving as an attaching means for the standards or angle irons 30 serve to brace the top. The angle irons or standards 30 which are L-shaped in cross section have one of their sides extended inwardly at their lower end portions for forming ears 35. The ears 35 are mounted on the outwardly and horizontally extending ribs or flanges 36 of the crank case 37 of the internal combustion engine which in this case is the prime mover. The crank case is provided with the usual oil pan 38 secured thereto by a plurality of spaced cap screws 39 two of which are also extended through the apertured ears 35 for securely attaching the lower portions of the standards 30 to the tractor or more specifically to the prime mover of the same. By this means the lower portions of the standards are rigidly attached to the tractor without in any way altering the construction of the same or providing additional bolts or other fastening means. The intermediate portions of the standards 30 are connected by a transversely extending bar 40 formed from angle iron.

With reference to Figs. 1 and 3, it will be noted that the intermediate portion of the transversely extending bar 40 is provided with a head 42 having its under side provided with a semi-circular recess 43 for receiving and engaging the water manifold 44 of the prime mover. The head 42 is held in rigid engagement with the water manifold by a U-shaped bolt 45 which is extended about the vertical portion of the water manifold. The forward ends of the U-bolt are of course screw threaded and are provided with nuts which serve to rigidly secure the same to the head 42. In this manner the head 42 and consequently the transversely extending bar 40 may be securely attached to the tractor without in any way interfering with the operation of the prime mover or necessitating any alterations in the construction of the same. In thus securely attaching the transversely extending bar 40 to the tractor the standards 30 are also braced and are prevented from swinging forwardly or rearwardly as the result of vibration of the tractor.

With reference to Fig. 2, it will be noted that the standards 30 are also mutually braced by a pair of inclined brace rods 47 which are secured at their upper and lower ends to the standards or angle bars 30 as indicated at 48. The cross rods 47 serve as an efficient means for preventing side swinging of the top.

The rear portion of the top 23 is supported by a pair of angle bars 50 which are secured at their upper ends by bolts 51 to the rear cross beam 33. The standards 50 which are L-shaped in cross section are also secured to the rear cross beam 33 by a pair of inwardly inclined braces 53 secured at points spaced downwardly from the upper ends of the standards and attached to said cross beam 33 at points inwardly from its ends. In this manner the standards 50 are securely attached to the top so that movement of the top with relation to the standards is prevented.

With reference to Figs. 1 and 2, it will be noted that each section of the rear axle housing is provided with a clamping or attaching device generally designated by the numeral 55. Each clamp comprises semi-circular sections 56 and 57 having apertures 58 for the reception of fastening bolts 59. The semi-circular section 56 of each clamp is provided at its upper end with a vertical extension 60 to which is attached the adjacent lower end portion of the standard 50. As each standard 50 is L-shaped is cross section, the sides and edges of each extension 60 are firmly gripped by the lower ends of the standards. Bolts 63 are extended through the lower end portions of the standards 50 and the extension 60 whereby the standards are securely and rigidly attached to the rear axle housing. The opposed sides of the sections 56 and 57 are provided with transversely extending semi-circular recesses 64 which, when the clamps are applied and connected, form cylindrical openings through which the end portions of a brace rod 62 are extended. Nuts 65 which are threaded onto the ends of the brace rod 62 firmly secure the clamps 55 in a set position on the housing and prevent the clamps from moving outwardly in the direction of the wheels as the result of loosening. The transversely extending brace rod 62 braces the under side of the axle housing and forms what might be termed a strut rod. A second brace rod 69 may be secured at its ends to the clamps 55 through the medium of apertured ears 73 formed on the outer sides of the semi-circular sections 56. The brace rod 69 which is securely connected at its ends to the clamps 55 by nuts or other suitable fastening devices coöperates with the first mentioned brace rods 62 in preventing the clamps 55 from moving outwardly as the result of loosening caused by vibration of the tractor.

The front and rear standards 30 and 50 respectively are connected by inclined brace rods 66 which are attached to the lower portions of the standards 30, as indicated at 67, and to the upper portions of the rear standards 50, as indicated at 68. The braces 66 serve to effectively prevent the longitudinal swinging of the top as the result of the forward movement of the tractor or vibration of the same.

In the use of the Fordson tractor it has been found that the traction wheels 14 throw up considerable mud and therefore the tractor is soon rendered unsightly. To overcome this difficulty I have provided a pair of fenders 70 with vertical and horizontal portions 71 and 72 respectively. The mud guards or fenders 70 are arranged over the traction wheels in spaced relation to the same and serve to prevent mud from flying from the traction wheels. The vertical portions 71 of the fenders also prevent the clothing of the operator from becoming entangled in the obliquely arranged traction blades in the wheels. As illustrated in Fig. 1, the fender of each wheel is of a length greater than the diameter of the wheel and therefore absolutely prevents mud from being thrown up onto the tractor or operator from the wheel. The vertical portion 71 of each fender is provided with an angularly extending brace 74 having its upper end portion extending angularly, as indicated at 75, and anchored or secured to the fender by a bolt 76. The lower end portion of each bracing arm or rod 74 is also extended angularly, as indicated at 77, and is apertured for receiving one of the cap screws 18 whereby the braces 74 are rigidly connected to the rear axle housing without in any way altering the construction of the same. The forward portions of the fenders are braced by a supporting rod 80 secured to the dash 81 by bolts 82. The bolts 82 are threaded into openings in the dash which are intended for the reception of screw bolts employed for attaching a tool box. So in this manner also no alteration in the construction of the tractor is necessary to attach the fenders thereto. The end portions of the rod 80 are extended upwardly to form arms 83 rigidly attached to the vertical portions of the fenders by bolts 84. The arms 83 are connected to the vertical portions of the fenders above the horizontal plane of the upper ends of the brace rods 74 so that the fender is substantially supported and prevented from undue movement.

In applying the improved fenders or mud guards, the attaching devices 80 and 72 are first secured to the tractor and the vertical portions 71 of the fenders are subsequently attached to the outer portions of the members 74 and 83. When applied, the fenders serve to effectively prevent mud from splashing onto the tractor or on the operator of the same.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. The combination with a tractor having an internal combustion engine provided with laterally extending case flanges and bolts connecting the flanges, of a top extending above the tractor, and standards connected to said top and having their lower end portions formed with lateral ears mounted upon said flanges, certain of said bolts being extended through said ears for securing the same to said flanges.

2. The combination with a tractor having an engine, of a top arranged above the tractor, a pair of standards connected to said top and having their lower ends secured to opposite sides of said engine, a transversely extending brace connected at its ends to the intermediate portions of said standards, means to connect the intermediate portion of said transversely extending brace to the upper side of said engine, and a supporting device for the rear end of said top.

3. The combination with a tractor having an engine, of a top arranged above the tractor, a pair of standards secured to opposite sides of said top and the forward portion of said engine, a transversely extending brace connected at its ends to the intermediate portions of said standards, a head secured to the intermediate portion of said brace and in contact with the upper side of said engine, and means to secure said head to the upper side of said engine.

4. The combination with a tractor having an internal combustion engine provided with a water manifold, of a top arranged above the tractor, a pair of standards connected at its upper ends to said top and at its lower ends to said engine, a transversely extending brace connected at its ends to the intermediate portions of said standards, a head secured to the intermediate portion of said brace and provided in its lower side with a recess receiving said manifold, and a U-bolt surrounding said manifold and connected to said head whereby the transversely extending brace is rigidly secured to said engine.

5. The combination with a tractor having a rear axle housing, of a top arranged above the tractor, a pair of standards secured to said top, attaching devices arranged about said axle housing and comprising pairs of coacting semi-circular sections, means for connecting said attaching devices to the lower ends of said standards, and a transversely extending brace rod engaging the intermediate portion of said axle housing, said attaching devices being provided with openings receiving the ends of said brace rods.

6. The combination with a tractor having a rear axle housing, of a top arranged above the tractor, a pair of standards secured to said top, clamps arranged about said axle housing and comprising pairs of coacting semi-circular sections having their opposed sides provided with semi-circular recesses forming cylindrical openings, and a brace rod having its ends extended through said openings for securely connecting the attaching devices and securing the same in a set position upon the axle housing.

7. The combination with a tractor having a differential housing, of pairs of semi-circular sections arranged about said differential housing, means for securing said sections together and about said housing, a brace rod connected to the lower portions of said semi-circular sections and extending longitudinally beneath the axle housing, one member of each pair of semi-circular sections being provided with a laterally extending apertured ear, a brace rod secured at its ends in said apertured ears and extending longitudinally of the housing, standards each secured to one of said semi-circular sections, and a top supported by said standards.

In testimony whereof I affix my signature.

NILS ANDERSON. [L. S.]